W. H. JOHNSON.
MILK-COOLER.

No. 171,816.

2 Sheets—Sheet 1.

Patented Jan. 4, 1876.

Witnesses:
Will W. Dodge
Donn Twitchell

Inventor:
W. H. Johnson,
by Dodge & Son
Att'ys.

W. H. JOHNSON.
MILK-COOLER.
No. 171,816. Patented Jan. 4, 1876.
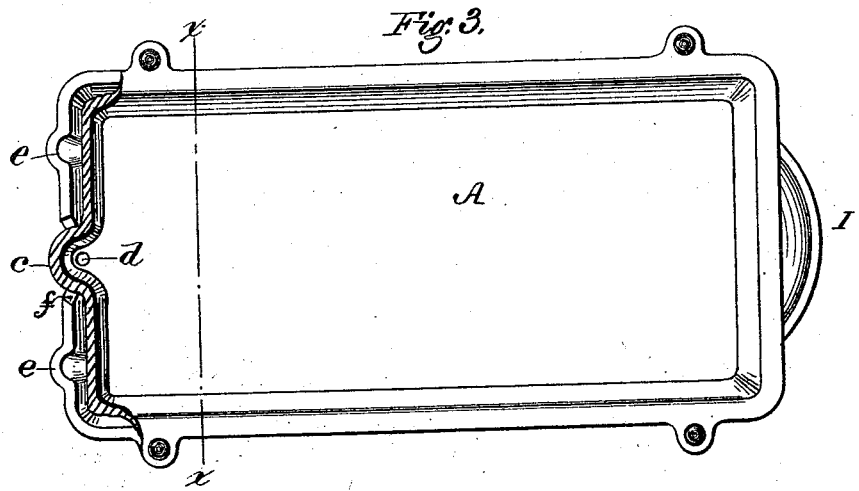
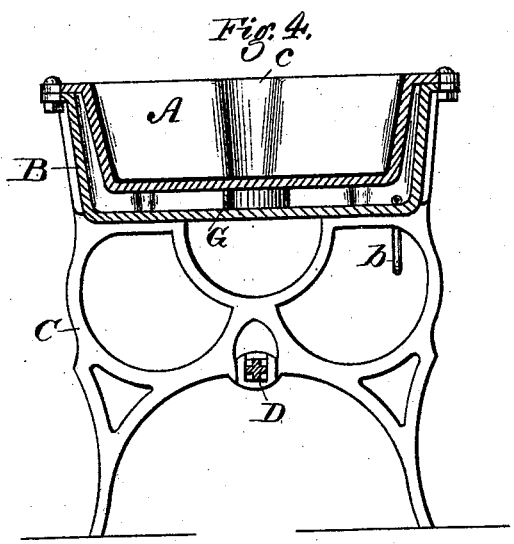

UNITED STATES PATENT OFFICE.

WILLIAM HENRY JOHNSON, OF DELHI, NEW YORK, ASSIGNOR OF ONE-HALF HIS RIGHT TO HERBERT A. PITCHER AND FREDERICK A. RAY, OF SAME PLACE.

IMPROVEMENT IN MILK-COOLERS.

Specification forming part of Letters Patent No. 171,816, dated January 4, 1876; application filed December 11, 1875.

*To all whom it may concern:*

Be it known that I, WILLIAM HENRY JOHNSON, of Delhi, in the county of Delaware and State of New York, have invented certain Improvements in Milk-Coolers, of which the following is a specification:

The present invention consists of certain improvements on the milk-cooler patented to me June 29, 1875, No. 165,102, the invention having reference to a curved rib between the pan and vat; also the construction of the end of the pan and vat for the admission of the water, and for packing the joint where the pan projects beyond the vat, at the point where the milk or cream is drawn off, all as hereinafter more fully described.

Figure 1:
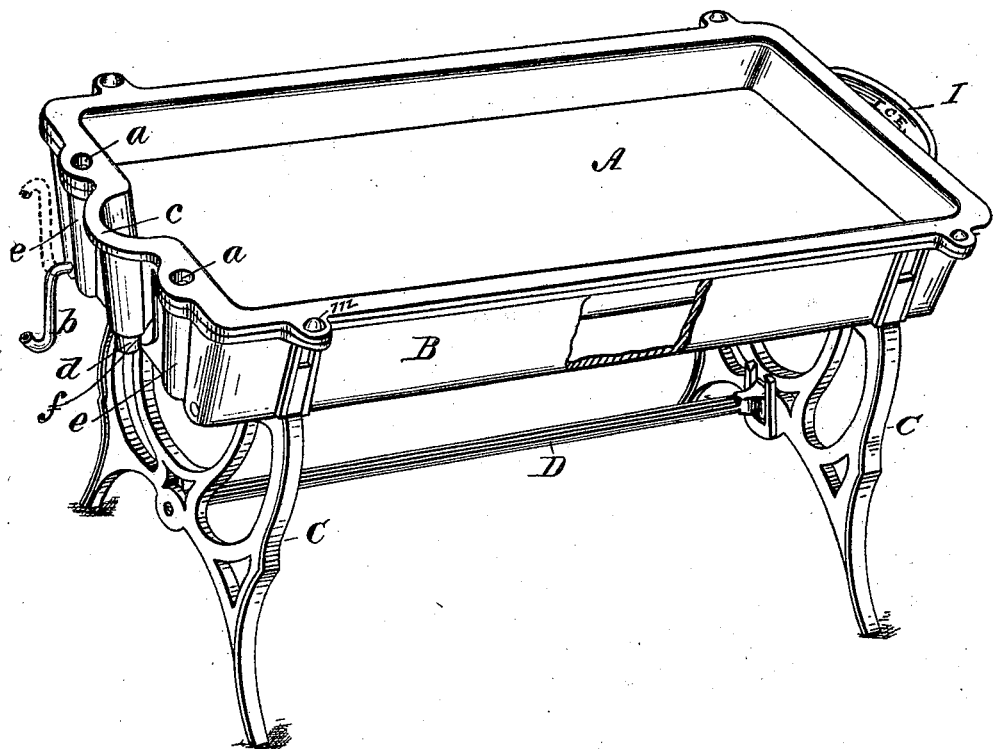
Figure 2:
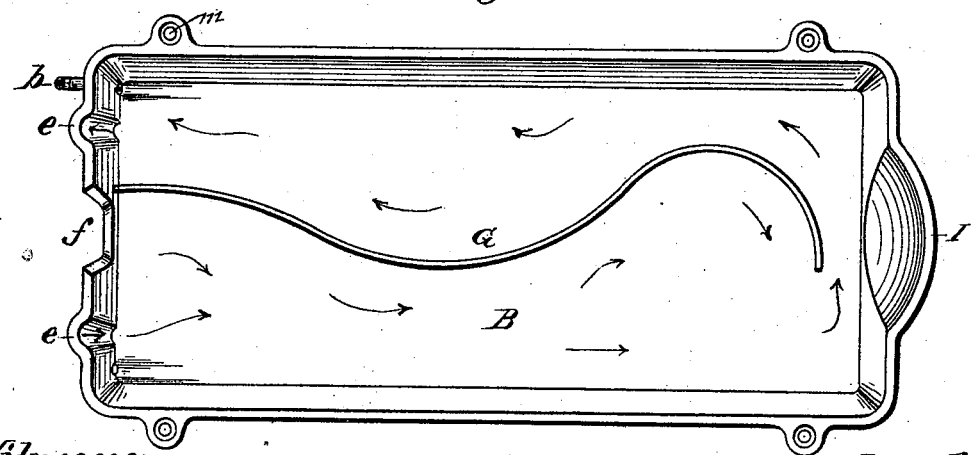

Figure 1 is a perspective view, with a portion broken away to show the interior. Fig. 2 is a top-plan view of the vat; Fig. 3, a top-plan view of the pan and vat, with a portion in section; and Fig. 4 is a transverse vertical section on the line $x\ x$ of Fig. 3.

In this, as in my former patent, the pan A and the vat B are both made of cast-iron, the pan being enameled on its inner surface.

As shown in Fig. 2, I form a curved rib, G, on the upper surface of the bottom of the vat B, which rib extends from one end to near the other, and is of such a height as to reach vertically to the bottom of the pan when the latter is in place, as shown in Fig. 4. This rib not only serves to strengthen and support the bottom of the vat and pan, but it also serves to make the water flow from front to rear and back again, and also tends to break up the current, and thus cause the entering water to travel over all parts of the intervening space between the pan and vat, as indicated by the arrows in Fig. 2, instead of passing directly through the center of the spaces, and leaving a body of still water at the sides, as would otherwise be the tendency. The curvature of this rib may be varied more or less from that shown, and it may be cast upon the bottom of the pan, or, as shown in Fig. 2, upon the inner face of the vat; or it may be made separate and then secured to either at will, the effect being essentially the same in either case. It is, however, cheaper to cast it with the vat or pan, and I therefore prefer that plan.

The great advantage of this construction over those heretofore made, in which a series of ribs were arranged to form a zigzag channel or water-way, is, first, a large decrease in the cost of manufacture; and, secondly, the increased facility for cleaning the vat, it being highly important that the vat, as well as the pan, shall be kept scrupulously clean, in order to prevent the milk or its products from being tainted, and thereby injuring its quality. Where there are a series of ribs arranged so as to form numerous corners or sharp angles it is both difficult and tedious to clean them, while this single curved rib answers every purpose, and affords little or no obstruction to the cleansing of the vat by scouring, rubbing, or otherwise.

In practice, these coolers are used in sets of two or more—generally four in a set; and it is desirable to so construct them that the water may be made to enter at either side of the center, according to the manner or position in which they are placed. With this view, and also to simplify and cheapen their construction, I make the vat with two curved projections, $e$, at one end, as shown in Figs. 1, 2, and 3, there being corresponding holes, $a$, made in the flange of the pan, as represented in Fig. 1, into either of which the supply-pipe for the water may be inserted, the water passing readily down between the pan and the vat at those points, and flowing thence along on either side of the rib G, and back along the opposite side, and out at the bent pipe $b$.

When a set of coolers are arranged side by side they can be readily connected by means of pieces of pipe or flexible tubing, and the same water thus made to pass through an entire set, it passing back and forth in each, as already described, the connections all being made at one end.

Instead of packing across the entire end, as in my former patent, I construct the vat B with a notch or recess, $f$, at one end, as shown in Fig. 2, and on the corresponding end of the pan I form a projection, $c$, as shown in Figs. 1 and 3, of such a size as to fit in and fill, or very near fill, this notch or recess, so that in order to pack the joint it is only necessary to put a layer of putty around the edge of the recess $f$, and, pressing the projecting part $c$ of the pan thereon, secure the pan in place by bolts in its flange, as represented at $m$ in Figs. 1 and 2. In the bottom of this projecting part $c$ is a hole or tube, $d$, which projects outside of the vat, as shown in Figs. 1 and 3, which serves to draw off the contents of the pan, it being provided with a suitable plug or faucet when in use. At the opposite end the vat has its rim curved outward, thus forming a projection, I, as shown in Figs. 1 and 2, which serves as a receptacle for ice when it is necessary or desirable to use it.

The cooler is supported upon metallic legs or frames C at each end, as shown in Fig. 1; and to strengthen and steady the parts I propose to connect these with a rod, D, which may be connected thereto by a dovetail, as represented in Fig. 1, or by any other suitable means. If desired, this rod may be so curved as to be secured at the center to the under side of the vat, thus making it act as a brace to the legs or supports C.

Having thus described my invention, what I claim is—

1. The vat B, provided with the curved rib G, substantially as shown and described.

2. The vat B, provided with the notch or recess $f$, in combination with the pan A, provided with the projection $c$, arranged to fit in said recess or notch, substantially as shown and described.

3. The vat B, provided with the recesses or curved projections $e$, in combination with the pan A, having the holes $a$, substantially as described.

WILLIAM HENRY JOHNSON.

Witnesses:
 C. A. FOOTE,
 D. PETTENGILL.